Sept. 15, 1931.       E. C. BREWER       1,823,314
KITCHEN APPLIANCE MACHINE
Filed April 30, 1930     2 Sheets-Sheet 1

INVENTOR
E. C. BREWER
BY Hazard and Miller
ATTORNEYS

Sept. 15, 1931.  E. C. BREWER  1,823,314
KITCHEN APPLIANCE MACHINE
Filed April 30, 1930   2 Sheets-Sheet 2

INVENTOR
E. C. BREWER
BY *Hazard and Miller*
ATTORNEYS

Patented Sept. 15, 1931

1,823,314

UNITED STATES PATENT OFFICE

EVERETT C. BREWER, OF LOS ANGELES, CALIFORNIA

KITCHEN APPLIANCE MACHINE

Application filed April 30, 1930. Serial No. 448,614.

This invention relates to a machine for driving kitchen appliances.

An object of the invention is to provide a machine utilizing a source of power and which may have any of a number of different appliances applied thereto so as to be effectively driven to accomplish various functions in a kitchen or under analogous conditions.

The improved machine is so designed as to provide a common seat which will receive all of the appliances. It is intended, however, that the various appliances be so designed as to accomplishe various functions and by virtue of this it is desirable to have some appliances driven at a given speed and other appliances driven at a different speed.

An object of the invention may, therefore, be considered as being to provide a machine having a source of power and having a common seat to receive the various appliances, the appliances and machine being so constructed that on positioning the appliance on the seat it will be automatically connected up to the machine in such a manner as to cause the appliance to be driven at that speed for which it was designed.

A further object of the invention is to provide a machine for kitchen purposes and the like which is of simple and durable construction and which will ocupy a minimum amount of space and which will be useful in doing quite a number of kitchen operations.

With the foregoing and other objects in view, which will be made manifest in the following detailed description, and specifically pointed out in the appended claims, reference is had to the accompanying drawings for an illustrative embodiment of the invention, wherein:

Figure 1:
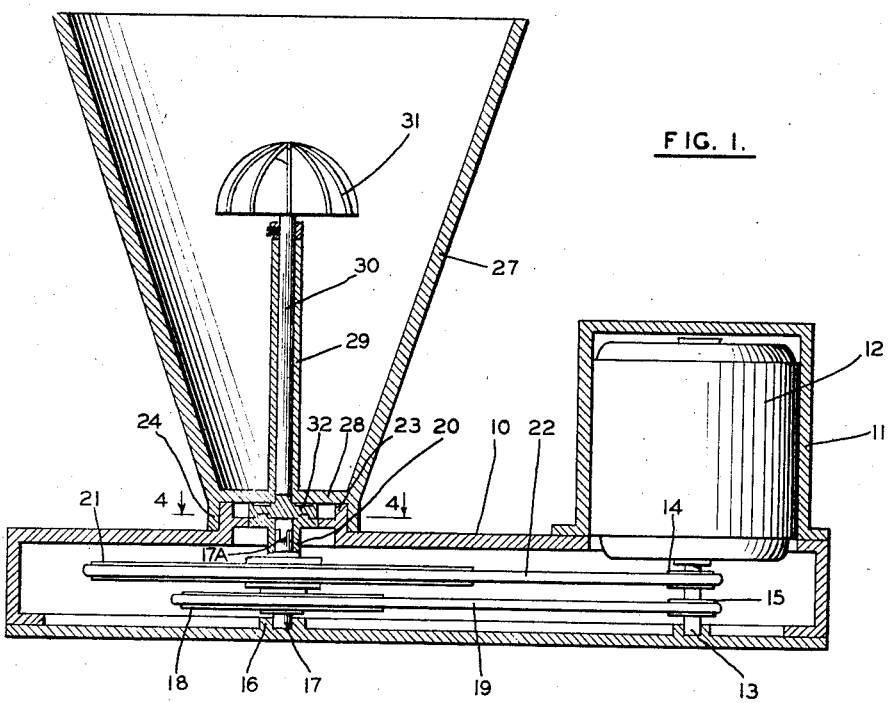
Fig. 1 is a longitudinal vertical section through the improved machine illustrating one form of appliance as applied thereto.

Referring to the accompanying drawings, wherein similar reference character designate similar parts throughout, the improved machine comprises a relatively flat housing 10, adjacent one end of which there is mounted a motor housing 11 for an electric motor 12. The rotor shaft 13 of the motor extends downwardly into the housing and has its end rotatable in a bearing provided at the bottom of the housing. On the rotor shaft there are two pulleys 14 and 15, shown as being of equal diameter, but these pulleys may have various diameters if desired. Adjacent the other end of the housing 10 and on the bottom thereof there is formed a bearing 16 for a vertical spindle 17. A pulley 18 is mounted on the spindle and an endless belt 19 travels over pulley 18 and over pulley 15. Pulley 18 is rigidly mounted on the spindle 17 and serves as a support for a bushing 20 which is rotatable on the spindle.

Bushing 20 has a pulley 21 rigid therewith and an endless belt 22 travels over pulley 21 and pulley 14. In this manner the motor 12, serving as a common source of power, drives both the spindle 17 and bushing 20. By virtue of the fact that pulley 21 is much greater in diameter than pulley 18 bushing 20 will be rotated at a slower speed than spindle 17. About the upper end of the spindle and the bushing there is formed an aperture in the top of the housing about which there is an upstanding flange 23 forming a seat which is common to all of the various appliances which may be applied to the machine. All of the various appliances have a downwardly extending flange 24 adapted to snugly fit about the upstanding flange 23 and while upstanding flange 23 is shown as being cylindrical in form, it may be polygonal, so that its shape will prevent the appliance from being turned or rotated on the seat. The upper end of spindle 17 is shown as having been provided with a diametrical slot 17A and the top of bushing 20 is shown as having diametrically opposed upstanding bosses or lugs 25.

A number of different appliances may be provided for use in conjunction with the machine. Only a few of the various appliances, which may be provided, are illustrated. To clearly disclose the invention Figure 1 illustrates a lemon squeezer as applied to the machine. This lemon squeezer comprises a cup 27 having a bottom 28 and the depending flange 24 previously referred to. In the center of the bottom there is positioned an upwardly extending tube 29 within which a spindle or shaft 30 is rotatable. The body of the lemon squeezer, which may be grooved or fluted as is conventional, is indicated at 31. In squeezing lemons and other citrus fruits it is desirable that the body 31 be rotated at a comparatively slow speed. The bottom of the shaft 30 has formed thereon a disc 32 which has diametrically opposed recesses which will receive the lugs or bosses 25. It will thus be clearly understood that in positioning the lemon squeezer on the housing 10 that when the lugs 25 enter the recesses 32 they will establish a driving connection between shaft 30 and bushing 20 so that the body 31 will be rotated at a comparatively low speed. The halves of lemons and other citrus fruit may be pressed downwardly on body 31 during its rotation and the juice collected in the bottom of the cup 27. When sufficient juice has been collected the complete appliance may be removed from the machine and the juice poured from the cup into bowls, glasses, or the like.

Figures 3, 4:
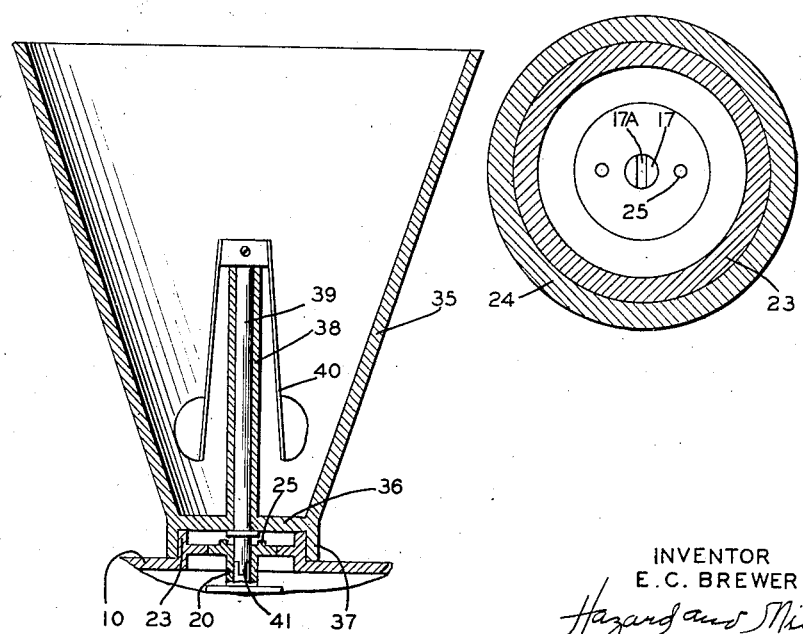
Fig. 3 is a vertical section through another form of appliance.
Fig. 4 is a horizontal section taken substantially upon the line 4—4 upon Fig. 1.
Figure 2:
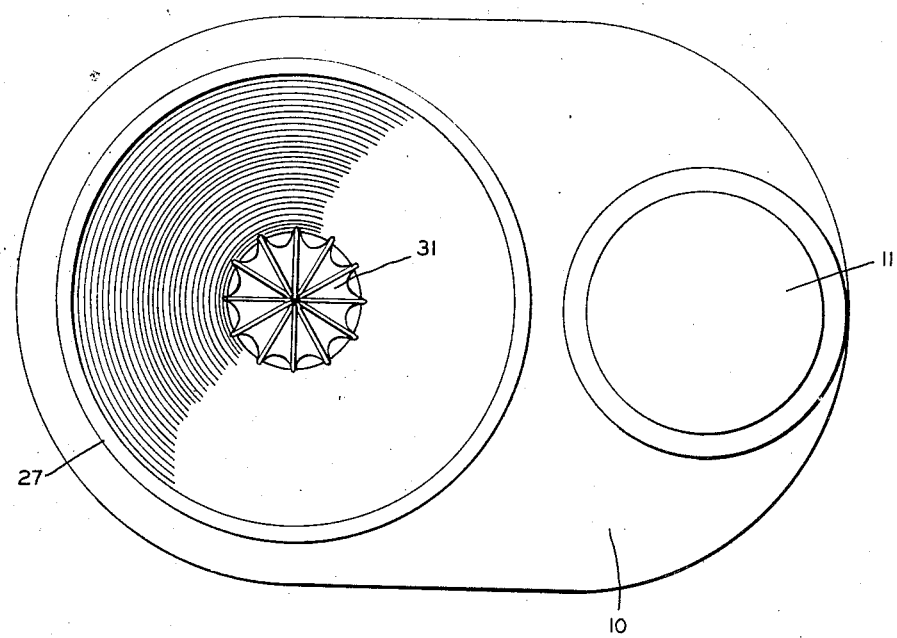
Fig. 2 is a top plan view of the same.

To further illustrate the invention there is illustrated in Figure 3 an egg beater. This device comprises a cup 35 having a bottom 36 and depending flange 37 which will fit snugly about flange 23. In the center of the bottom there is the upstanding tube 38 within which the shaft or spindle 39 is rotatable. A pair of depending arms 40 forming the beating elements of the egg beater is mounted on the top of the shaft. The lower end of the shaft 39 is provided with a diametrical key or feather 41 complementary to the diametrical slot 17A so that on positioning the egg beating appliance on the seat its shaft 39 will be automatically connected to spindle 17 rather than bushing 20. This causes the shaft 39 to be driven at a higher speed than that at which shaft 30 is driven. The eggs or parts thereof can be positioned in cup 35 and the cup positioned on the seat. The arms 40 will be driven at a high speed which is sufficiently high to thoroughly and efficiently beat the eggs.

Figure 5:
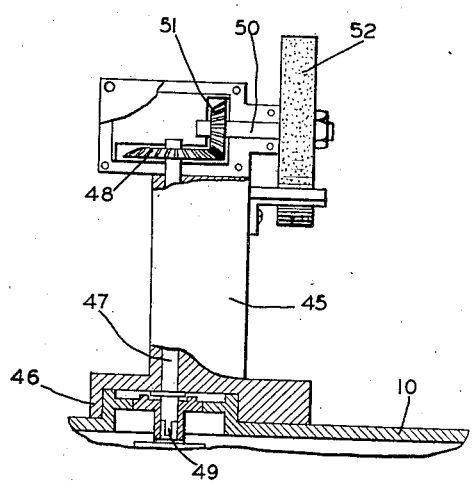
Fig. 5 is a view in elevation, parts being broken away and shown in section, illustrating a further form of appliance which may be used in conjunction with the improved machine.

In Figure 5 a further appliance is illustrated, comprising a standard 45 having a depending flange 46 which will fit snugly on the seat. A vertical shaft 47 is rotatable in the standard having at its top a beveled gear 48. The shaft 47 is likewise illustrated as having a key or feather 49 which will establish a driving connection with spindle 17 on positioning the appliance on the housing.

The standard 45 also rotatably supports a horizontal shaft 50 having a beveled gear 51 meshing with gear 48. The horizontal shaft 50 also carries a grind stone 52. In sharpening knives and other implements it is desirable to rotate the grind stone at a comparatively high speed, consequently shaft 47 forms the driving connection with spindle 17 rather than bushing 20.

From the above described construction it will be appreciated that an improved kitchen machine is provided which is of simple yet durable construction and which may be provided with a plurality of different appliances, only a few of which have been illustrated. For example other appliances that might be employed, are a cake batter mixer, or a bread mixer, and things of like nature. Where the device is of such a nature that it should be driven at a low speed its shaft connects it with bushing 20. At the same time if the appliance is such that it should be driven at a comparatively high speed its shaft connects it with spindle 17. In this manner a number of different appliances may be provided all of which are receivable upon the same identical seat and which on being applied thereto will automatically connect themselves to either the spindle or the bushing so that the particular appliance will be driven at the proper speed by motor 12. A comparatively small constant speed motor may be utilized for this purpose. It will be readily appreciated that the improved machine occupies a minimum amount of space and can handle quite a number of different appliances.

Various changes may be made in the details of construction without departing from the spirit or scope of the invention as defined by the appended claims.

I claim:

1. A device of the class described comprising a housing, a motor mounted therein, a vertically arranged spindle within the housing, a vertically arranged sleeve within the housing surrounding the spindle, means for driving the spindle at one speed by the motor, means for driving the sleeve at a different speed by the motor, the upper ends of the sleeve and spindle being provided with clutch elements, a seat on the housing surrounding the spindle and sleeve, and an appliance positioned to coact with the seat and provided with a rotary element having a clutch constructed to coact with the clutch element of the spindle to effect rotation of the rotary element.

2. A device of the class described comprising a housing, a motor mounted therein, a vertically arranged spindle within the housing, a vertically arranged sleeve within the housing surrounding the spindle, means for driving the spindle at one speed by the motor, means for driving the sleeve at a different speed by the motor, the upper ends of the sleeve and spindle being provided with clutch elements, a seat on the housing surrounding the spindle and sleeve, and an appliance positioned to coact with the seat and provided with a rotary element having a clutch constructed to coact with the clutch element of the sleeve to effect rotation of the rotary element.

3. A kitchen appliance machine comprising a housing, a seat on the housing for an appliance, a spindle and sleeve telescopically related within the housing, a bearing for the spindle on the housing at the bottom of the spindle, a bearing for the sleeve at the top of the sleeve, clutch elements on the sleeve and spindle at their upper ends, and an appliance provided with a rotary element adapted to be applied on said seat, said rotary element having clutch elements designed to engage the clutch elements on the spindle.

4. A kitchen appliance machine comprising a housing, a seat on the housing for an appliance, a spindle and sleeve telescopically related within the housing, a bearing for the spindle on the housing at the bottom of the spindle, a bearing for the sleeve at the top of the sleeve, clutch elements on the sleeve and spindle at their upper ends, and an appliance provided with a rotary element adapted to be applied on said seat, said rotary element having clutch elements designed to engage the clutch elements on the sleeve.

5. A device of the class described comprising a housing, a motor mounted therein, a vertically arranged spindle within the housing, a vertically arranged sleeve within the housing surrounding the spindle, means for driving the spindle by the motor at one speed, means for driving the sleeve by the motor at a different speed, said sleeve and shaft having clutch elements at their upper ends, a seat on the housing surrounding the spindle and sleeve, and a plurality of appliances each of which is adapted to be positioned on said seat, each appliance being provided with a rotary element, the rotary elements of some of the appliances having clutches designed to automatically engage the spindle when those appliances are applied to the seat and the rotary elements of the other appliances having clutch elements designed to automatcially engage the sleeve when those appliances are applied to the seat.

In testimony whereof I have signed my name to this specification.

E. C. BREWER.